(12) United States Patent
Cheung et al.

(10) Patent No.: US 11,764,672 B1
(45) Date of Patent: Sep. 19, 2023

(54) SIGNAL BOOSTING IN SERIAL INTERFACES

(71) Applicant: Diodes Incorporated, Plano, TX (US)

(72) Inventors: Sin Luen Cheung, Hong Kong (HK); Chi Wa Lo, Hong Kong (HK); Yiu Ting Chou, Manchester (GB)

(73) Assignee: Diodes Incorporated, Plano, TX (US)

( * ) Notice: Subject to any disclaimer, the term of this patent is extended or adjusted under 35 U.S.C. 154(b) by 0 days.

(21) Appl. No.: 17/809,377

(22) Filed: Jun. 28, 2022

(51) Int. Cl.
*H02M 3/07* (2006.01)
*G06F 13/42* (2006.01)
*G06F 13/40* (2006.01)

(52) U.S. Cl.
CPC .......... *H02M 3/07* (2013.01); *G06F 13/4022* (2013.01); *G06F 13/4282* (2013.01)

(58) Field of Classification Search
CPC ... H02M 3/07; G06F 13/4282; G06F 13/4022
See application file for complete search history.

(56) References Cited

U.S. PATENT DOCUMENTS

| | | | | |
|---|---|---|---|---|
| 8,237,414 B1* | 8/2012 | Li | ....................... | H02J 7/00047 320/160 |
| 8,289,257 B1* | 10/2012 | Simon | .................. | G09G 3/3611 330/69 |
| 8,769,343 B2 | 7/2014 | Jaramillo | | |
| 8,966,128 B1 | 2/2015 | Li et al. | | |
| 9,710,411 B2 | 7/2017 | Maung et al. | | |
| 9,800,235 B2* | 10/2017 | Tang | ................ | H03K 19/00315 |
| 11,575,376 B2* | 2/2023 | Man | ................. | H03K 17/08142 |
| 11,588,517 B2* | 2/2023 | Guo | ........................ | H04B 3/56 |
| 11,669,475 B2* | 6/2023 | Kamath | ............... | H03K 5/2472 710/305 |
| 2012/0106237 A1* | 5/2012 | Dengler | ................. | G11C 5/145 711/E12.001 |
| 2016/0226282 A1* | 8/2016 | Ye | .............................. | H02J 7/00 |
| 2019/0190374 A1* | 6/2019 | Piccardi | .................. | H02M 3/07 |
| 2019/0288743 A1* | 9/2019 | Wang | ...................... | H04L 25/24 |
| 2023/0030111 A1* | 2/2023 | Lesso | ................. | H03K 17/6871 |

\* cited by examiner

*Primary Examiner* — Henry Tsai
*Assistant Examiner* — Christopher A Daley
(74) *Attorney, Agent, or Firm* — Steven A. Shaw; Weaver Austin Villeneuve & Sampson LLP; John Griffith

(57) ABSTRACT

Systems and methods for signal boosting in serial interfaces are provided. In some implementations, a system for boosting signals comprises boosting circuitry. The boosting circuitry may comprise at least one boosting capacitor configured to be operatively coupled to a voltage supply during a charging phase and configured to be operatively coupled to the at least one line of a signal transmission line during a discharging phase, wherein, during the discharging phase, the at least one boosting capacitor boosts a voltage of the one or more signals transmitted on the at least one line. The boosting circuitry may comprise switching circuitry configured to switch the at least one boosting capacitor between from being operatively coupled to the voltage supply to being operatively coupled to the at least one line of the signal transmission line.

21 Claims, 7 Drawing Sheets

SIGNAL BOOSTING IN SERIAL INTERFACES

BACKGROUND

Signal transmission lines may be utilized to transmit data, such as serialized data, between an upstream device and a downstream device. However, in some cases, data signal strength may deteriorate over the length of the signal transmission line, for example, due to the resistance of the signal transmission line. This may cause failures in data communication, for example, due to the data signal being too weak to be accurate read by the downstream device upon receipt.

SUMMARY

Methods and systems for signal boosting in signal transmission lines are disclosed herein.

According to certain implementations, a system for boosting signals comprises boosting circuitry. The boosting circuitry may comprise at least one boosting capacitor configured to be operatively coupled to a voltage supply during a charging phase and configured to be operatively coupled to the at least one line of a signal transmission line during a discharging phase, wherein, during the discharging phase, the at least one boosting capacitor boosts a voltage of the one or more signals transmitted on the at least one line. The boosting circuitry may comprise switching circuitry configured to switch the at least one boosting capacitor between from being operatively coupled to the voltage supply to being operatively coupled to the at least one line of the signal transmission line.

In some examples, the boosting circuitry is integrated into the signal transmission line.

In some examples, the at least one line comprises a first line and a second line, the first line configured to transmit a first signal and the second line configured to transmit a second signal, and wherein the first signal and the second signal are utilized for differential signaling. In some examples, the at least one boosting capacitor comprises a first boosting capacitor configured to boost a voltage of the first line and a second boosting capacitor configured to boost a voltage of the second line. In some examples, the switching circuitry is further configured to cause the first boosting capacitor to be operatively coupled to the first line in the discharging phase responsive to the first signal being greater than the second signal, and wherein the switching circuitry is further configured to cause the second boosting capacitor to be operatively coupled to the second line in the discharging phase responsive to the second signal being greater than the first signal. In some examples, the first boosting capacitor is operatively coupled to the voltage supply in the charging phase while the second boosting capacitor is operatively coupled to the second line in the discharging phase, and wherein the second boosting capacitor is operatively coupled to the voltage supply in the charging phase while the first boosting capacitor is operatively coupled to the first line in the discharging phase.

In some examples, the voltage supply is programmed to supply a voltage determined based on an amount of the boost of the voltage to be provided to the one or more signals.

In some examples, the switching circuitry is configured to switch the at least one boosting capacitor from being operatively coupled to the voltage supply to being operatively coupled to the at least one line of the signal transmission line responsive to an output of an edge detection component. In some examples, the edge detection component is an equalizer. In some examples, a frequency response of the equalizer is programmable.

In some examples, a duration of the discharging phase is programmable, and wherein the duration of the discharging phase causes an amplification of high-frequency signals corresponding to a pre-emphasis of a rising edge and/or a falling edge of the one or more signals, and wherein the amplification of the high-frequency signals counteract a low-pass filter effect of the signal transmission line.

In some examples, the one or more signals abide by a Universal Serial Bus (USB) protocol.

According to certain implementations, a method for boosting signals comprises obtaining one or more signals transmitted via at least one line of a signal transmission line that couples an upstream device to a downstream device. The method may further comprise responsive to detecting a rising edge and/or a falling edge in the one or more signals, causing a boosting capacitor to switch from being operatively coupled to a voltage supply in a charging phase to being operatively coupled to the at least one line of the signal transmission line in a discharging phase, wherein the boosting capacitor transfers charge to the at least one line while in the discharging phase.

In some examples, the at least one line comprises a first line and a second line, the first line configured to transmit a first signal and the second line configured to transmit a second signal, and wherein the first signal and the second signal are utilized for differential signaling. In some examples, the at least one boosting capacitor comprises a first boosting capacitor configured to boost a voltage of the first line and a second boosting capacitor configured to boost a voltage of the second line. In some examples, the method further comprises: causing the first boosting capacitor to be operatively coupled to the first line in the discharging phase responsive to the first signal being greater than the second signal; and causing the second boosting capacitor to be operatively coupled to the second line in the discharging phase responsive to the second signal being greater than the first signal. In some examples, the first boosting capacitor is operatively coupled to the voltage supply in the charging phase while the second boosting capacitor is operatively coupled to the second line in the discharging phase, and wherein the second boosting capacitor is operatively coupled to the voltage supply in the charging phase while the first boosting capacitor is operatively coupled to the first line in the discharging phase.

In some examples, the method further comprises: determining a duration of the discharging phase; and setting the duration of the discharging phase to the determined duration. In some examples, the duration of the discharging phase is determined by determining an amount of amplification of high-frequency signals corresponding to a pre-emphasis of the rising edge or the falling edge, and wherein the amplification of the high-frequency signals counteracts a low-pass filter effect of the signal transmission line.

In some examples, the rising edge and/or the falling edge is detected by an equalizer.

In some examples, the one or more signals abide by a Universal Serial Bus (USB) protocol.

A further understanding of the nature and advantages of various implementations may be realized by reference to the remaining portions of the specification and the drawings.

DETAILED DESCRIPTION

Figure 1:
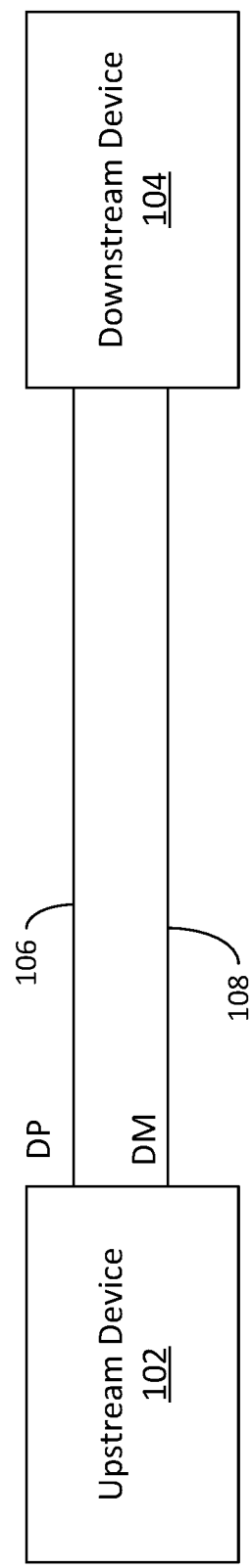
FIG. 1 is a schematic diagram of an example system including an upstream device and a downstream device according to some implementations.

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

Disclosed herein are systems, methods, circuits, and techniques for boosting signals transmitted via a signal transmission line. In particular, in some implementations, one or more boosting capacitors may be switched between a charging phase, in which a boosting capacitor is operatively coupled to a voltage supply, and a discharging phase, in which the boosting capacitor is operatively coupled to a data line of the signal transmission line, thereby transferring stored charge to the line to boost the signal. The techniques described herein may be implemented with relatively simple components, such as a semiconductor fabricated integrated capacitor, which may allow the systems described herein to be implemented with stable temperature coefficients and relatively small production variations. Moreover, as will be discussed below in more detail, the techniques disclosed herein may allow signals to be boosted without limitation from a headroom limit associated with a voltage supply. Furthermore, as will be discussed below in more detail, the techniques disclosed herein may be implemented with high-speed data communication, because the boosting capacitors described herein may be switched between phases with relatively low latency. Accordingly, the techniques described herein may be utilized in connection with signal transmission lines configured for high-speed data communication. It should be noted that the techniques described herein may be implemented with uni-directional and bi-directional data communication.

It should be understood that, as used herein, a "signal transmission line" generally refers to any suitable media or path that is configured to allow electrical signal propagation. For example, a signal transmission line may include a printed circuit board (PCB) trace line. As another example, a signal transmission line may include a cable.

A signal transmission line may be used to communicate data between an upstream device (e.g., a transmitter device) and a downstream device (e.g., a receiver device). The signal transmission line may be used to transmit, e.g., serialized data that operates in conjunction with a serial interface, such as a Universal Serial Bus (USB) or USB 2.0 interface. In some cases, there may be signal attenuation due to resistance of the signal transmission line, which may impede data communication between the upstream device and the downstream device. For example, a data signal transmitted from the upstream device to the downstream device may be sufficiently attenuated by the time the signal is received at the downstream device that the downstream device cannot read and/or utilize the received signal. Data attenuation may be particularly pronounced for relatively long signal transmission lines such as those over 3 meters, those over 5 meters, those over 10 meters, etc. As one example, a cable used to transmit, e.g., signals abiding by a USB 2.0 protocol, may become sufficiently attenuated at the downstream device as to be rendered un-usable, or cause cascading data errors.

Many examples described herein utilize USB and/or USB 2.0 signaling protocols. For example, a signal transmission line may transmit two signals, generally referred to herein as DP and DM. These two signals may be considered differential signals, where an output signal S may be determined by subtracting DM from DP. Because the output signal S is a digital signal, the downstream device may determine S as DP-DM. The downstream device may then set S as 1 if the difference is positive, and set S as 0 if the difference is negative. It should be noted that, in order for S to be accurately determined, the DP and DM signals must remain sufficiently un-attenuated that the downstream device can accurately determine S. In other words, if DP and DM attenuate past a threshold level, the difference between DP and DM may no longer accurately be used to determine the output signal S.

FIG. 1 illustrates a schematic diagram of an example system that includes an upstream device 102 and a downstream device 104. Upstream device 102 and downstream device 104 may be operatively coupled via a signal transmission line. The signal transmission line may include data lines configured to transmit the DP signal 106 and the DM signal 108. Note that the distance between upstream device 102 and downstream device 104, and therefore, the length of the signal transmission line, is not indicated in FIG. 1. In some embodiments, the distance may be 1 meter, 3 meters, 5 meters, 10 meters, 20 meters, etc.

As described above, a signal may attenuate between an upstream device and a downstream device. Signal attenuation may be visualized using an eye diagram. In particular, the eye diagram may show an average of amplitudes of several measurements of a data signal. In some cases, an eye diagram may include an inner region that indicates a minimum threshold for data signal amplitude to indicate whether a signal has deteriorated beyond a threshold level.

Figure 2:
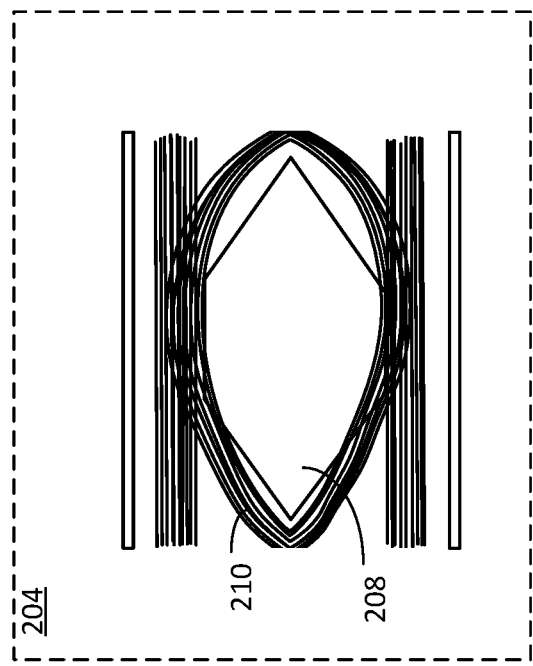
FIG. 2 illustrate example eye diagrams that depict signal deterioration between an upstream device and a downstream device according to some implementations.
Figure 2:
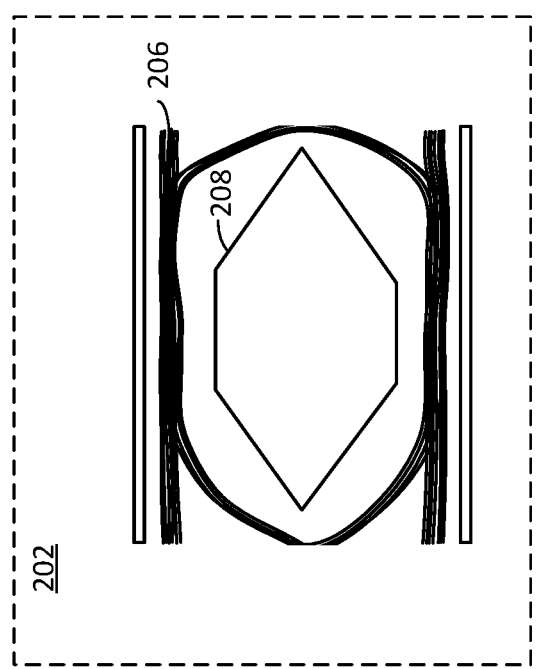

FIG. 2 depicts two example eye diagrams, 202 and 204. Eye diagram 202 depicts signals measured at a signal transmission line location relatively near a transmitting device, whereas eye diagram 204 depicts signals measured at a signal transmission line location relatively near a receiving device. Referring to eye diagram 202, data signal 206 is shown, which illustrates an average of multiple data signal measurements. Eye diagram 202 also depicts region 208, which represents a desired signal magnitude. Note that the entirety of data signal 206 is entirely outside of region 208, indicating that, at the signal transmission line location relatively near the transmitting device, signal attenuation is minimal, as expected.

Referring to eye diagram 204, data signal 210 is shown. Similar to data signal 206, data signal 208 illustrates an average of multiple data signal measurements, with the difference that the data signal measurements of data signal 208 are measured downstream relative to those of data signal 206. Eye diagram 204 includes region 208. Note that portions of data signal 210 are within region 208, indicating that, at the signal transmission line location relatively near the receiving device, signal attenuation has increased to the point where data communication may be impeded. In other words, at the location at which the data signals were measured to construct data signal 210, the data signals may lead to errors when read and/or utilized by the receiving device.

Previous techniques have been attempted to solve the problem of deteriorating or attenuated data signals within a signal transmission line. For example, one technique may use a signal re-driver, which may include a receiver, an equalizer, and a transmitter to capture and amplify data signals. However, signal re-driving may present problems. For example, a signal re-driver may perform best with uni-directional transmission through the signal transmission line, whereas, for many protocols, the data line is bi-directional. To use the signal re-driver technique with a bi-directional data line, a buffer may be utilized to detect signal directionality and accordingly switch the data driver. However, switching the data driver using a buffer may add substantial latency, and may therefore be unsuitable for use with high-speed data interfaces.

As another example, a second technique may use current boosting to boost a signal. However, this technique may have its own drawbacks. For example, current injection may be implemented by coupling a resistor to a voltage source. However, because the resistance of the resistor, as well as the duration over which current is injected, are not well controlled, the amount of current injected is also not well controlled. Moreover, referring to the DP and DM signals of a USB 2.0 signaling protocol, current boosting may be performed by separately boosting the DP and DM signals. Because the amount of current injected is not well controlled (as described above), the DP and DM signals may be boosted by different amounts, causing the DP and DM signals to no longer be symmetric with respect to a center offset value creating a DC offset bias. Such asymmetry may cause problems when utilizing the DP and DM signals in differential signaling to determine the output signal (as described above). Furthermore, because the DP line may already be close to ground, and the DP signal may already be close to VDD (the power supply voltage), the amount of boost that can be provided may be limited.

Disclosed herein are methods, systems, and techniques for boosting signals. In particular, in some implementations, one or more boosting capacitors are utilized to boost a signal. In particular, a boosting capacitor may be configured to operate in a charging phase, in which the boosting capacitor is operatively coupled to a voltage supply, or in a discharging phase, in which the boosting capacitor is operatively coupled to a data line of a signal transmission line. The boosting capacitor may be switched between the charging phase and the discharging phase such that, during the charging phase, the boosting capacitor stores charge from the voltage supply, and, during the discharging phase, discharges the stored charge to the data line to boost the voltage of the data signals.

Figure 3:
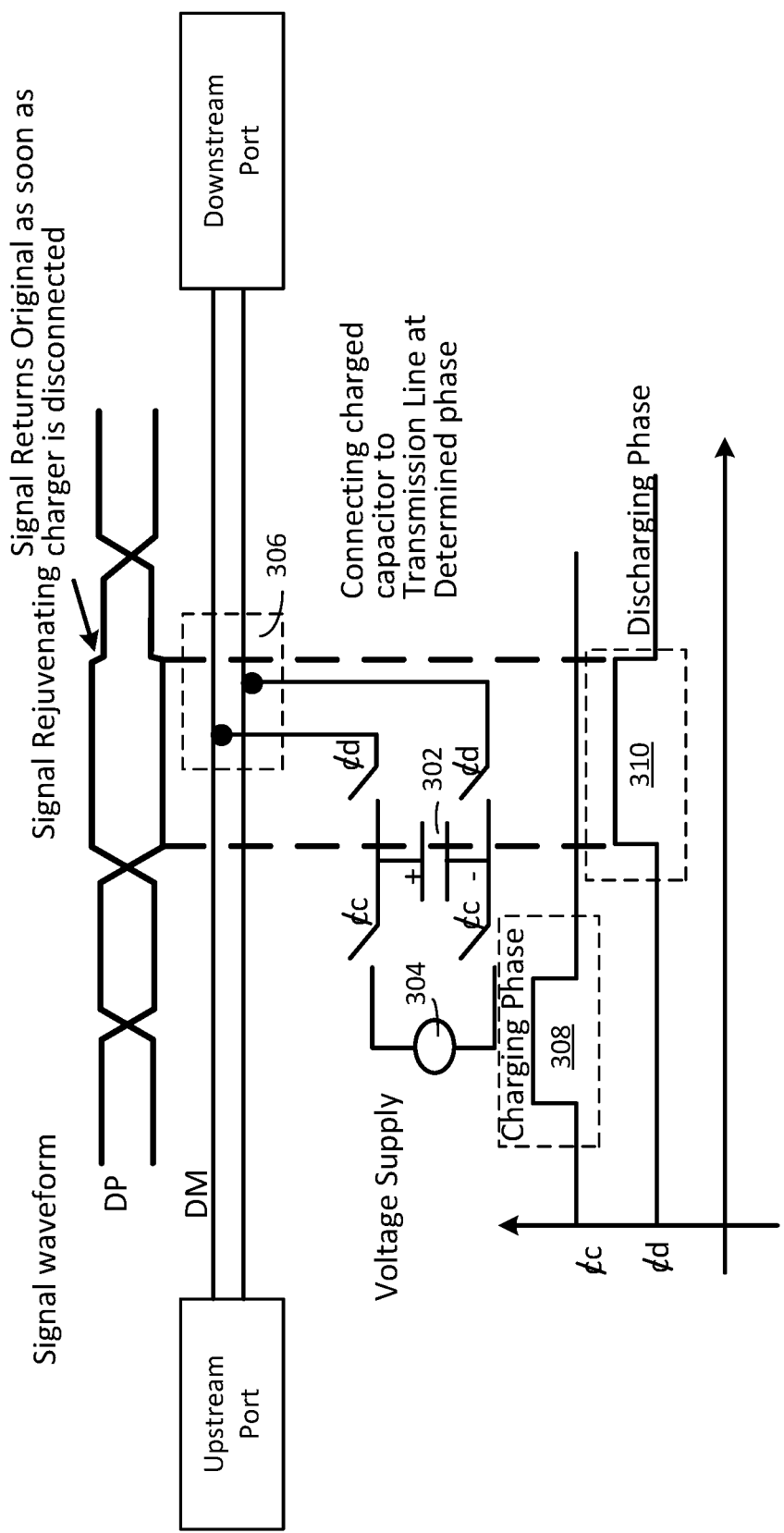
FIG. 3 is a schematic diagram of an example system for boosting signal voltages within a signal transmission line according to some implementations.

FIG. 3 is a schematic diagram that illustrates an example of usage of a boosting capacitor to boost data signals. As illustrated, a boosting capacitor 302 may be configured to either be operatively coupled to a voltage supply 304 in a charging phase, or operatively coupled to data lines 306 during a discharging phase. For example, during the discharging phase, a positive terminal of boosting capacitor 302 may be coupled to the DP line, while the negative terminal of boosting capacitor 302 may be coupled to the DM line. By way of example, during charging phase 308, boosting capacitor 302 may be operatively coupled to voltage supply 304, thereby causing boosting capacitor 302 to store charge. Continuing with this example, during discharging phase 310, boosting capacitor 302 may be operatively coupled to data lines 306, thereby causing boosting capacitor 302 to discharge the stored charge onto data lines 306, which in turn may cause a voltage of a data signal carried on data lines 306 to be boosted.

In some implementations, there may be multiple boosting capacitors. For example, in some embodiments, the multiple boosting capacitors may be configured to operate in a complementary manner. As a more particular example, in some embodiments, a first boosting capacitor may be configured to be in a charging phase (e.g., by being operatively coupled to a voltage supply) while a second boosting capacitor may be configured to be in a discharging phase (e.g., by being operatively coupled to a signal line).

In some embodiments, whether a particular boosting capacitor is in a charging phase or a discharging phase may be controlled by switching circuitry. For example, the switching circuitry may include an edge detector that detects, e.g., a rising edge and/or a falling edge. Continuing with this example, responsive to an edge being detected, the switching circuitry may cause a boosting capacitor to switch from a charging phase to a discharging phase, or vice versa. In a particular instance in which the signal lines include a DP line and a DM line (as is used in connection with USB 2.0 signaling protocols), a first boosting capacitor may be switched from a charging phase to a discharging phase responsive to a first edge detector detecting a rising edge. In other words, the discharging phase of the first boosting capacitor may be initiated responsive to DP being greater than DM. Conversely, a second boosting capacitor may be switched from a charging phase to a discharging phase responsive to a second edge detector detecting a falling edge. In other words, the discharging phase of the second boosting capacitor may be initiated responsive to DM being greater than DP. It should be noted that when a first boosting capacitor is switched (e.g., from charging phase to a discharging phase, or vice versa), the second boosting capacitor may concurrently be switched such that the first boosting capacitor and the second boosting capacitor remain in complementary phases, with one boosting capacitor being in the charging phase while the other is in the discharging phase.

Figure 4A:
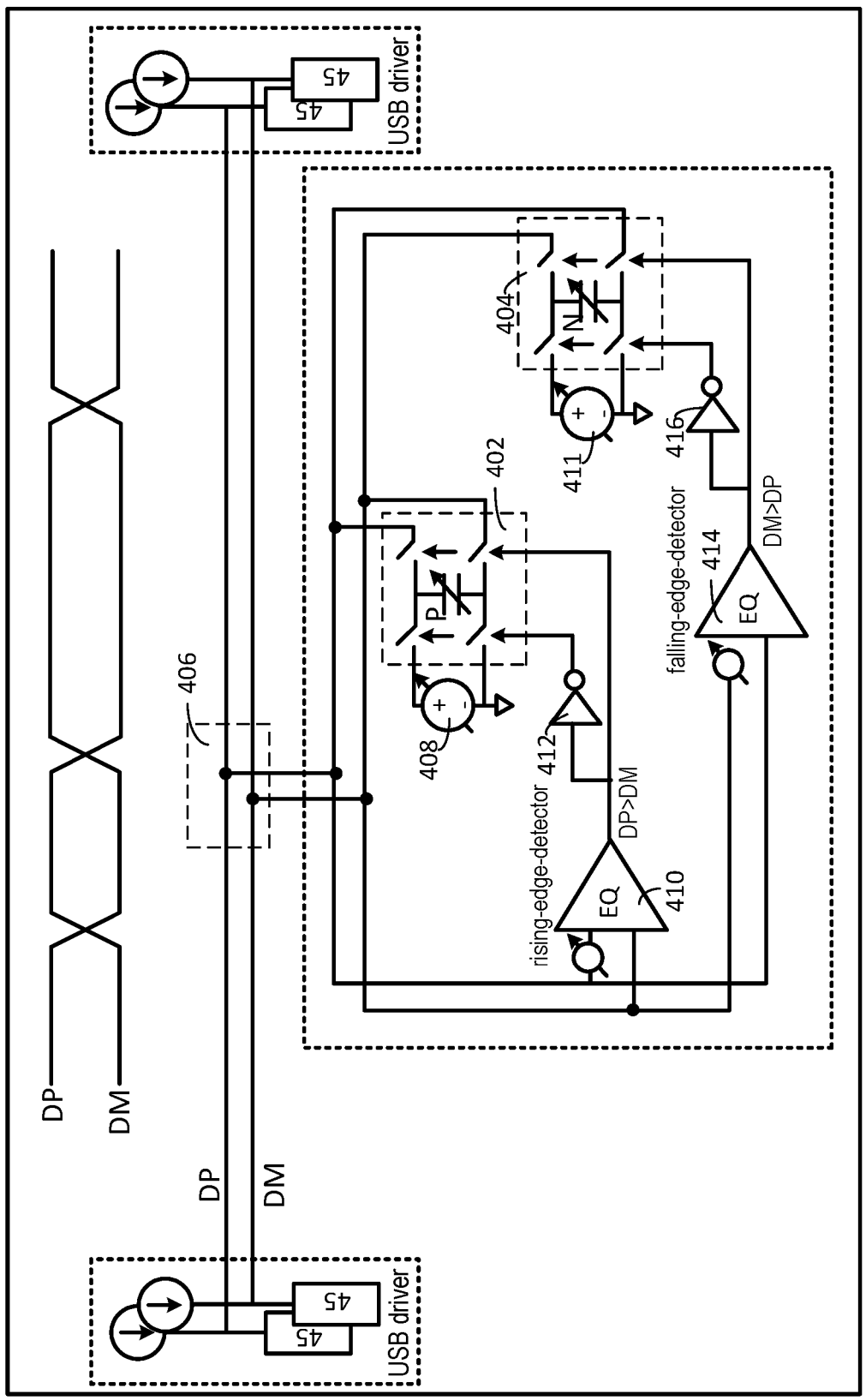
FIGS. 4A-4C depict schematic diagrams of an example implementation of a system for boosting signal voltages according to some implementations.
Figure 4B:
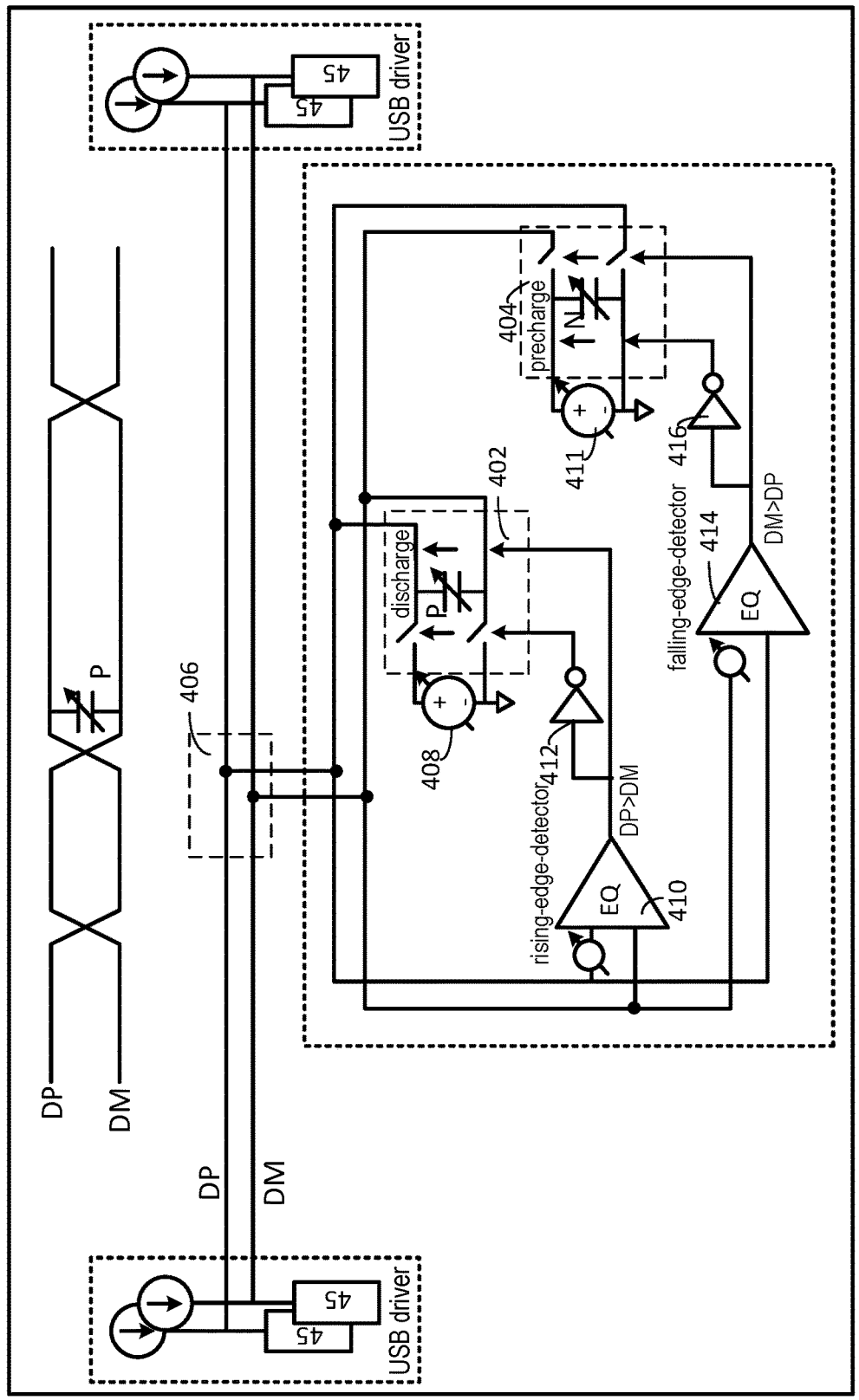
Figure 4C:
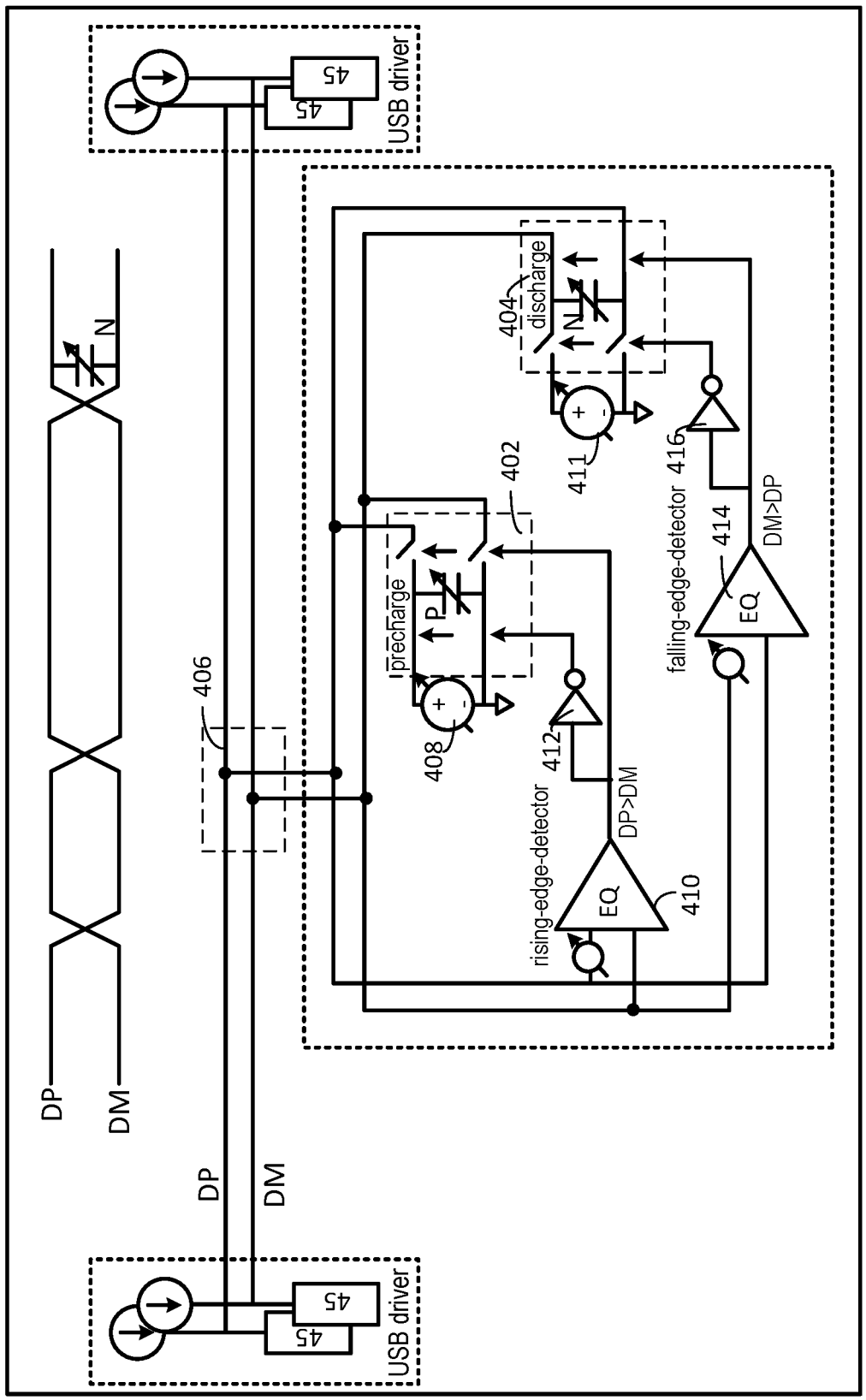

FIGS. 4A-4C depict schematic diagrams of an example system for implementing multiple boosting capacitors in accordance with some embodiments. As illustrated, a system may include a first boosting capacitor 402 and a second boosting capacitor 404. First boosting capacitor 402 and second boosting capacitor 404 may be configured to operatively couple to data signal lines 406 during a respective discharging phase. First boosting capacitor 402 may be configured such that, during the discharging phase, a positive plate of first boosting capacitor 402 is operatively coupled to the DP line, and a negative plate of first boosting capacitor 402 is operatively coupled to the DM line, as will be discussed below in more detail in connection with FIG. 4B. Second boosting capacitor 404 may be configured such that, during the discharging phase, a positive plate of second boosting capacitor 404 is operatively coupled to the DM line, and a negative plate of second boosting capacitor 404 is operatively coupled to the DP line, as will be discussed below in more detail in connection with FIG. 4C.

As illustrated in FIG. 4A, first boosting capacitor 402 is configured to be operatively coupled to a first voltage supply 408 during a charging phase. Similarly, second boosting capacitor 404 is configured to be operatively coupled to a second voltage supply 411 during a charging phase. Note that although FIG. 4A illustrates two separate voltage supplies, each associated with a corresponding boosting capacitor, in some implementations, first boosting capacitor 402 and second boosting capacitor 404 may be configured to operatively couple to the same voltage supply during their respective charging phases.

As illustrated in FIG. 4A, first boosting capacitor 402 may be switched between a charging phase and a discharging phase via a rising edge detector 410. For example, referring to FIG. 4B, responsive to rising edge detector 410 indicating that a voltage associated with the DP line is greater than a voltage associated with the DM line, a positive signal may be used to operatively couple first boosting capacitor 402 to signal lines 406 such that a positive plate of first boosting capacitor 402 is coupled to the DP line, and a negative plate of first boosting capacitor 402 is coupled to the DM line, as illustrated in FIG. 4B. Additionally, as illustrated in FIGS. 4A and 4B, an inverted signal from edge detector 410 may be generated by inverter 412, such that the inverted signal serves to disconnect first boosting capacitor 402 from first voltage supply 408. Accordingly, responsive to the DP signal being greater than the DM line, first boosting capacitor 402 may be switched from the charging phase to the discharging phase.

A similar technique may be utilized with respect to second boosting capacitor 404. For example, referring to FIG. 4C, responsive to falling edge detector 414 indicating that a voltage associated with the DM line is greater than a voltage associated with the DP line, a positive signal may be used to operatively couple second boosting capacitor 404 to signal lines 406 such that a positive plate of second boosting capacitor 404 is coupled to the DM line, and a negative plate of second boosting capacitor 404 is coupled to the DP line, as illustrated in FIG. 4C. Additionally, as illustrated in FIGS. 4A and 4C, an inverted signal from falling edge detector 414 may be generated by inverter 416, such that the inverted signal serves to disconnect second boosting capacitor 404 from second voltage supply 411. Accordingly, responsive to the DM line signal being greater than the DP line signal, second boosting capacitor 404 may be switched from the charging phase to the discharging phase.

Referring back to FIG. 4A, it should be understood that although rising edge detector 410 and falling edge detector 414 are each implemented as an equalizer, other circuitry may be utilized to implement an edge detector.

In some implementations, various aspects of a system that utilizes one or more boosting capacitor to boost signals transmitted via a signal transmission line may modified and/or programmed, for example. For example, in some implementations, the number of boosting capacitors used may be determined or set based on factors such as the length of the signal transmission line used, or the like. As a more particular, example, in some implementations, a relatively smaller number of boosting capacitors may be utilized for a shorter signal transmission line relative to a longer signal transmission line. As a specific example, referring to the first and second boosting capacitors utilized to boost the DM and DP lines as shown in and described above in connection with FIGS. 4A-4C, given a longer signal transmission line (e.g., 10 meters, 12 meters, 20 meters, etc.), additional pairs of first and second boosting capacitors may be utilized at various points along the longer signal transmission line in order to provide multiple points of signal boosting along the signal transmission line between the upstream device and the downstream device.

As another example, in some embodiments, in an instance in which an equalizer is utilized to implement an edge detector (e.g., as shown in and described above in connection with FIGS. 4A-4C), the frequency response and/or the gain of the equalizer may be programmed. As yet another example, in some embodiments, the threshold at which an edge transition (e.g., from DP being less than DM to DP being greater than DM, from DM being less than DP to DM being greater than DP, or the like) is detected may be programmed. This may allow the point of an edge transition at which signal boosting occurs to be set or modified. For example, by programming equalizer characteristics (e.g., frequency response, gain, or the like) and/or edge detection thresholds, boosting may be configured to occur at a beginning of a detected edge, at the end of a detected edge, or in the middle of an edge transition.

As still another example, in some implementations, a voltage supply utilized during a charging phase (e.g., to charge a boosting capacitor) may be programmed. For example, the voltage provided by the voltage supply may be set based on the particular application, such as based on an amount of expected attenuation and a corresponding amount of boost desired to counteract the expected attenuation. As a more particular example, the voltage supply may be programmed to provide a higher voltage in applications in which greater signal attenuation is expected (e.g., due to use of a longer signal transmission line). In some implementations, the voltage supply may be programmed based on tolerance to data communication errors. For example, the voltage supply may be programmed to provide a higher voltage for applications with relatively lower tolerance to data communication errors relative to applications with relatively higher tolerance to data communication errors.

In some implementations, various aspects of a system that implements signal boosting may be programmed or configured to provide a pre-emphasis to a signal at an edge transition (e.g., a rising edge transition or a falling edge transition). In particular, because the signal transmission line may be considered to act as a transmission line with low-pass filter characteristics, the high-frequency components corresponding to an edge (e.g., a rising edge or a falling edge) may be attenuated due to the low-pass filter characteristics, thereby causing an edge, when received by the downstream device, to have a rounded shape rather than a square shape. Continuing with this example, in some implementations, a system may be configured to pre-emphasize the high-frequency components of the edge in order to counteract the low-pass filter effects of transmission through the signal transmission line. For example, the pre-emphasis may include a boost in the high-frequency components that cause a rising edge to overshoot the plateaued signal level or that cause a falling edge to undershoot the plateaued signal level. Pre-emphasis of the high-frequency components may be performed by programming a duration over which a boosting capacitor is discharged and/or by programming a time relative to an edge transition at which the boosting capacitor is discharged. The time relative to the edge transition (e.g., at the start of the transition, at the end of the transition, in the middle of the transition, or the like) may be programmed by programming a switch resistance of switches that operatively couple the boosting capacitor to the signal lines.

Figure 5:
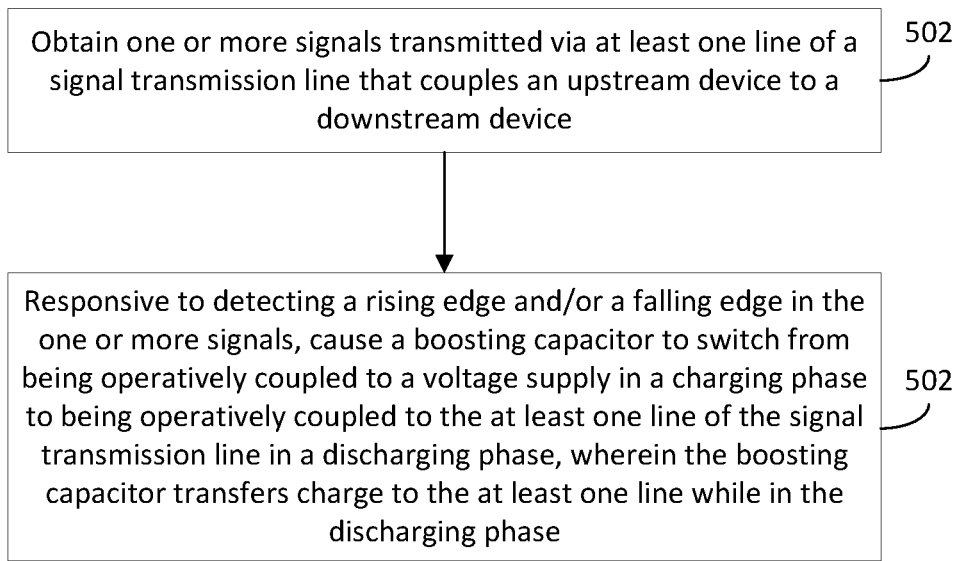
FIG. 5 is a flowchart of an example process for boosting signal voltages according to some implementations.

FIG. 5 is a flowchart of an example process 500 for boosting signals in signal transmission lines in accordance with some implementations. Blocks of process 500 may be executed by one or more components of boosting circuitry, which may include one or more edge detectors, one or more inverting circuits, one or more boosting capacitors, one or more voltage supplies, or the like. In some implementations, blocks of process 500 may be executed in an order other than what is shown in FIG. 5. In some implementations, two or more blocks of process 500 may be executed substantially in parallel. In some implementations, one or more blocks of process 500 may be omitted.

Process 500 can begin at 502 by obtaining one or more signals transmitted via at least one line of a signal transmission line that couples an upstream device to a downstream device. As described above, the one or more signals may be transmitted via one or more lines of the signal transmission line. As a particular example, as shown in and described above in connection with FIGS. 1, 3, and 4A-4C, the one or more signals may correspond to signals from a DP line and signals from a DM line used for differential signaling, e.g., in communications abiding by the USB or USB 2.0 protocol. It should be noted that the signal transmission line may be any suitable length, e.g., 1 meter, 2 meters, 5 meters, 10 meters, 20 meters, etc.

As described above in connection with FIGS. 3 and 4A-4C, the signal transmission line may be associated with any suitable number of boosting circuitry instances (e.g., one, two, five, etc.) along the signal transmission line, each of which are configured to boost a signal along at least one line of the signal transmission line. A boosting circuitry instance may include any suitable number of boosting capacitors (e.g., one, two, or the like), where each boosting capacitor is configured to be operatively coupled to a voltage supply during a charging phase and configured to be operatively coupled to at least one line of the signal transmission line during a discharging phase. Examples of such boosting circuitry instances are shown in and described above in connection with FIGS. 3 and 4A-4C. It should be noted that, in some embodiments, boosting circuitry may be integrated into a cable that serves as the signal transmission line. In instances in which the signal transmission line is a PCB trace, boosting circuitry may be electrically coupled to the PCB trace.

At 504, process 500 can, responsive to detecting a rising edge and/or a falling edge in the one or more signals, cause a boosting capacitor (e.g., associated with a given boosting circuitry instance) to switch from being operatively coupled to a voltage supply in a charging phase to being operatively coupled to the at least one line of the signal transmission line in a discharging phase. In other words, the boosting capacitor may transfer charge to the at least one line during the discharging phase in order to boost the signal of the at least one line. As shown in and described above in connection with FIGS. 4A-4C, in some implementations, a boosting circuitry instance may have two or more boosting capacitors, which may operate in a complementary manner. For example, in the example shown in FIGS. 4A-4C, a first boosting capacitor may be in a charging phase while a second boosting capacitor is in a discharging phase, and vice versa. In some embodiments, a first boosting capacitor may be switched to a discharging phase responsive to a DP signal being greater than a DM signal, and a corresponding second boosting capacitor may be switched to a discharging phase responsive to the DM signal being greater than the DP signal. Note that, in such instances, by boosting both the DP and DM signals, the DC common mode between the DP and DM lines may remain stable, e.g., without affecting the DC bias voltage.

In some implementations, edge detection may be implemented via an equalizer, as shown in and described above in connection with FIGS. 4A-4C. As described above, in some implementations, characteristics of the equalizer, such as a frequency response and/or gain may be programmed, which may affect the amount of signal boost and/or the timing of the signal boost with respect to the edge transition. Other aspects of the boosting circuitry may be programmable, such as the number of boosting capacitors utilized, the voltage provided by each voltage supply, a signal threshold used to detect an edge transition, or the like. Additionally or alternatively, as described above, in some implementations, a discharging phase duration and/or a time at which the discharging phase is initiated (with respect to the rising edge or falling edge transition) may be programmable and/or modified. Adjusting the discharging phase duration and/or the time at which the discharging phase is initiated with respect to the edge transition may serve to pre-emphasize the edge transition, thereby boosting the high-frequency components of the signal to counteract the low-pass filter effect of the signal transmission line.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A system for boosting signals, comprising:
   boosting circuitry comprising:
      at least one boosting capacitor configured to be operatively coupled to a voltage supply during a charging phase and configured to be operatively coupled to the at least one line of a signal transmission line during a discharging phase, wherein, during the discharging phase, the at least one boosting capacitor boosts a voltage of the one or more signals transmitted on the at least one line; and
      switching circuitry configured to switch the at least one boosting capacitor between from being operatively coupled to the voltage supply to being operatively coupled to the at least one line of the signal transmission line.

2. The system of claim 1, wherein the boosting circuitry is integrated into the signal transmission line.

3. The system of claim 1, wherein the at least one line comprises a first line and a second line, the first line configured to transmit a first signal and the second line configured to transmit a second signal, and wherein the first signal and the second signal are utilized for differential signaling.

4. The system of claim 3, wherein the at least one boosting capacitor comprises a first boosting capacitor configured to boost a voltage of the first line and a second boosting capacitor configured to boost a voltage of the second line.

5. The system of claim 4, wherein the switching circuitry is further configured to cause the first boosting capacitor to be operatively coupled to the first line in the discharging phase responsive to the first signal being greater than the second signal, and wherein the switching circuitry is further configured to cause the second boosting capacitor to be operatively coupled to the second line in the discharging phase responsive to the second signal being greater than the first signal.

6. The system of claim 5, wherein the first boosting capacitor is operatively coupled to the voltage supply in the charging phase while the second boosting capacitor is operatively coupled to the second line in the discharging phase, and wherein the second boosting capacitor is operatively coupled to the voltage supply in the charging phase while the first boosting capacitor is operatively coupled to the first line in the discharging phase.

7. The system of claim 1, wherein the voltage supply is programmed to supply a voltage determined based on an amount of the boost of the voltage to be provided to the one or more signals.

8. The system of claim 1, wherein the switching circuitry is configured to switch the at least one boosting capacitor from being operatively coupled to the voltage supply to being operatively coupled to the at least one line of the signal transmission line responsive to an output of an edge detection component.

9. The system of claim 8, wherein the edge detection component is an equalizer.

10. The system of claim 9, wherein a frequency response of the equalizer is programmable.

11. The system of claim 1, wherein a duration of the discharging phase is programmable, and wherein the duration of the discharging phase causes an amplification of high-frequency signals corresponding to a pre-emphasis of a rising edge and/or a falling edge of the one or more signals, and wherein the amplification of the high-frequency signals counteract a low-pass filter effect of the signal transmission line.

12. The system of claim 1, wherein the one or more signals abide by a Universal Serial Bus (USB) protocol.

13. A method for boosting signals, comprising:
obtaining one or more signals transmitted via at least one line of a signal transmission line that couples an upstream device to a downstream device; and
responsive to detecting a rising edge and/or a falling edge in the one or more signals, causing a boosting capacitor to switch from being operatively coupled to a voltage supply in a charging phase to being operatively coupled to the at least one line of the signal transmission line in a discharging phase, wherein the boosting capacitor transfers charge to the at least one line while in the discharging phase.

14. The method of claim 13, wherein the at least one line comprises a first line and a second line, the first line configured to transmit a first signal and the second line configured to transmit a second signal, and wherein the first signal and the second signal are utilized for differential signaling.

15. The method of claim 14, wherein the at least one boosting capacitor comprises a first boosting capacitor configured to boost a voltage of the first line and a second boosting capacitor configured to boost a voltage of the second line.

16. The method of claim 15, further comprising:
causing the first boosting capacitor to be operatively coupled to the first line in the discharging phase responsive to the first signal being greater than the second signal; and
causing the second boosting capacitor to be operatively coupled to the second line in the discharging phase responsive to the second signal being greater than the first signal.

17. The method of claim 16, wherein the first boosting capacitor is operatively coupled to the voltage supply in the charging phase while the second boosting capacitor is operatively coupled to the second line in the discharging phase, and wherein the second boosting capacitor is operatively coupled to the voltage supply in the charging phase while the first boosting capacitor is operatively coupled to the first line in the discharging phase.

18. The method of claim 13, further comprising:
determining a duration of the discharging phase; and
setting the duration of the discharging phase to the determined duration.

19. The method of claim 18, wherein the duration of the discharging phase is determined by determining an amount of amplification of high-frequency signals corresponding to a pre-emphasis of the rising edge or the falling edge, and wherein the amplification of the high-frequency signals counteracts a low-pass filter effect of the signal transmission line.

20. The method of claim 13, wherein the rising edge and/or the falling edge is detected by an equalizer.

21. The method of claim 13, wherein the one or more signals abide by a Universal Serial Bus (USB) protocol.

* * * * *